United States Patent
Park

(10) Patent No.: US 7,725,003 B2
(45) Date of Patent: May 25, 2010

(54) DIGITAL BROADCAST RECORDER AND RECORDING METHOD THEREOF

(75) Inventor: Tae Jin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1127 days.

(21) Appl. No.: 11/360,404

(22) Filed: Feb. 24, 2006

(65) Prior Publication Data
US 2006/0193602 A1 Aug. 31, 2006

(30) Foreign Application Priority Data
Feb. 25, 2005 (KR) .................. 10-2005-0015845

(51) Int. Cl.
*H04N 5/93* (2006.01)
*H04N 5/91* (2006.01)
(52) U.S. Cl. .................................. 386/52; 386/83
(58) Field of Classification Search .................. 386/52, 386/55, 124, 125, 83, 46
See application file for complete search history.

(56) References Cited

U.S. PATENT DOCUMENTS 5,541,738 A * 7/1996 Mankovitz .................. 386/83

* cited by examiner

*Primary Examiner*—Robert Chevalier
(74) *Attorney, Agent, or Firm*—Birch, Stewart, Kolasch & Birch, LLP

(57) ABSTRACT

A digital broadcast recorder and a recording method thereof are disclosed. The recording method of a digital broadcast recorder having a storage medium, includes analyzing transmitted channel data and program data, and editing a broadcast program for the unit of program referring to the analyzed channel data and program data during recording of the broadcast program to store and manage the edited broadcast program in the storage medium. Therefore, it is possible to enhance a user's convenience when searching for and reproducing a recorded program.

16 Claims, 4 Drawing Sheets

FIG. 3

| order | program start time | program end time | channel number | program title |
|---|---|---|---|---|
| 1 | 2004-10-11 06:00 | 2004-10-11 06:45 | 7-1(KBS2) | KBS news forum |
| 2 | 2004-10-11 06:00 | 2004-10-11 08:00 | 6-1(SBS) | live Broadcast morning wide (first, second, and third parts) |
| 3 | 2004-10-11 06:00 | 2004-10-11 09:00 | 11-1(MBC) | MBC news today (first, second, and third parts) |
| 4 | 2004-10-11 06:45 | 2004-10-11 08:00 | 7-1(KBS2) | morning episode |
| 5 | 2004-10-11 07:45 | 2004-10-11 08:05 | 9-1(KBS1) | TV kindergarten one, two, three |
| 6 | 2004-10-11 08:30 | 2004-10-11 09:00 | 6-1(SBS) | selection(57th) |
| 7 | 2004-10-11 08:00 | 2004-10-11 09:00 | 7-1(KBS2) | live broadcast morning of world (third part) |
| ... | | | | |

DIGITAL BROADCAST RECORDER AND RECORDING METHOD THEREOF

This application claims the benefit of Korean Application No. 10-2005-0015845, filed on Feb. 25, 2005, which is hereby incorporated by reference as if fully set forth herein.

BACKGROUND OF THE INVENTION

1. Field of the Invention

The present invention relates to a digital broadcast recording, and more particularly, to a digital broadcast recorder and a recording method thereof, in which digital broadcasting is edited and recorded.

2. Discussion of the Related Art

A personal video recorder (PVR) is one of apparatuses for recording and reproducing digital broadcasting.

The PVR is to provide additional convenience functions to a viewer by adopting a digital storage medium, for example, a hard disk drive (HDD) in a digital broadcast receiver. The PVR provides more improved functions than those of a conventional video cassette recorder (VCR), such as a time-shift function, an instant replay function during viewing of live broadcasting, and other trick play functions, as well as a recording function of digital broadcasting in a recording medium. Moreover, the PVR can record digital broadcasting of high definition (HD) in a recording medium at any time, and has various additional service functions.

The PVR is provided with a central processing unit (CPU) of high performance, and records a digital broadcast program in a storage medium, such as a mass storage HDD, for the unit of file. Therefore, the PVR has advantages in that a viewer can readily search for the recorded program and view the searched program by repeatedly reproducing and simply editing it.

Examples of methods for recording a broadcast program using the PVR include "reserved recording," "instant recording during viewing of the program," and "time shift recording using a time shift function."

The time shift function allows a user to simultaneously store and reproduce a broadcast program currently in viewing. For example, if there is a phone call while the user views the current broadcast program, the user pushes a time shift button (for example, pause button) of a remote controller to store broadcast streams received later in an HDD. Then, the user can view the broadcasting streams, which are stored in the HDD, corresponding to the scene after the temporarily paused scene by pushing a play button after the phone call. In other words, recording and play are simultaneously carried out at a constant timing interval.

FIG. 1 is a flow chart illustrating a method for recording a broadcast program using a related art PVR.

As shown in FIG. 1, if video, audio and data streams are transmitted from a broadcasting station, electronic program guide (EPG) data are obtained from the data streams to view information of a broadcast program (S101).

At this time, the user can search for a desired broadcast program using either an input unit such as a remote controller or the EPG data to view it.

If the user selects a time shift function while viewing the program, viewing contents for a certain time period are temporarily stored in an HDD (S102).

Also, if the user selects instant recording by pushing a recording button of the remote controller or a main body while general viewing or time shift recording (S103), the broadcast program being currently displayed in the screen starts to be recorded in the HDD (S104).

Afterwards, if the user inputs a button for stopping instant recording, for example, a stop button of the remote controller or the main body, instant recording is stopped (S105). At this time, the PVR stops the broadcast program from being stored in the HDD and searches for the EPG data to add title, summary, and so on of a new recording program to a recording program list (S106 and S107). In this way, recording is completed.

The recording program generated as above may include various program time zones. Alternatively, the recording program may be generated in such a manner that the user changes a viewing channel in the middle of recording. Moreover, contents or program having no relation with the user's desired recording program may be recorded before or after the recorded program.

Therefore, checking and editing works for the recorded program are conventionally required (S108 and S109). In other words, since it is difficult for the user to identify its desired recording program through the recorded program, the user needs to re-view the recorded program to edit contents or program having no relation with the desired program.

To edit the recorded program, the user needs complicated manipulation of the remote controller. This could lead to great inconvenience to the user.

SUMMARY OF THE INVENTION

Accordingly, the present invention is directed to a digital broadcast recorder and a recording method thereof, which substantially obviate one or more problems due to limitations and disadvantages of the related art.

An object of the present invention is to provide a digital broadcast recorder and a recording method thereof, in which a recording program is automatically edited and stored for the unit of program using EPG data during recording of a broadcast program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording method of a digital broadcast recorder having a storage medium, includes analyzing transmitted channel data and program data, and editing a broadcast program for the unit of program referring to the analyzed channel data and program data during recording of the broadcast program to store and manage the edited broadcast program in the storage medium.

The channel data and program data include at least one of program start time, program end time, channel number, and title.

The recording of the broadcasting program is at least one of time shift recording, instant recording, and reserved recording.

In another aspect of the present invention, a digital broadcast recorder includes a storage medium, a data processor receiving channel data and program data and storing the received channel data and program data therein, and an auto-editing engine analyzing the stored channel data and program data during recording of a broadcast program, editing the broadcast program for the unit of program to store and manage the edited broadcast program in the storage medium.

In the present invention, since the digital broadcast recorder automatically edits and stores the broadcast program using the channel data and program data (for example, EPG data) for the unit of program during recording of the broadcast program, it is possible to enhance the user's convenience.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is an exemplary view illustrating an EPG broadcast table in a digital broadcast recorder according to the preferred embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

General terms are used in the present invention. However, with development of new technology, terms considered to be the most suitable ones by the applicant are selectively used. In this case, the terms would be defined clearly in a corresponding description part. Therefore, the terms used in the present invention should be understood as their meaning not their title.

Figure 1:
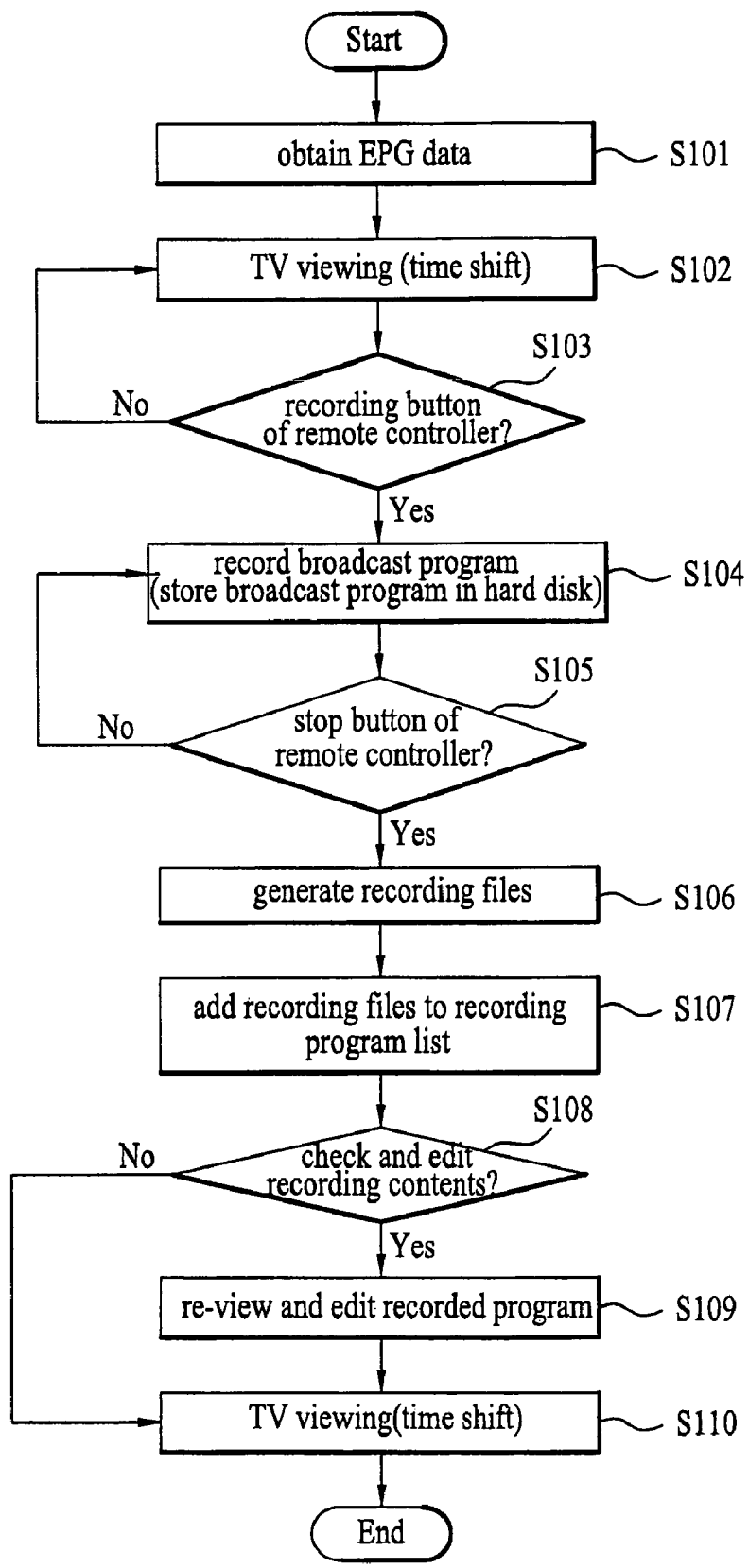
FIG. 1 is a flow chart illustrating a method for recording a broadcast program in a storage medium in a related art digital broadcast recorder.
Figure 2:
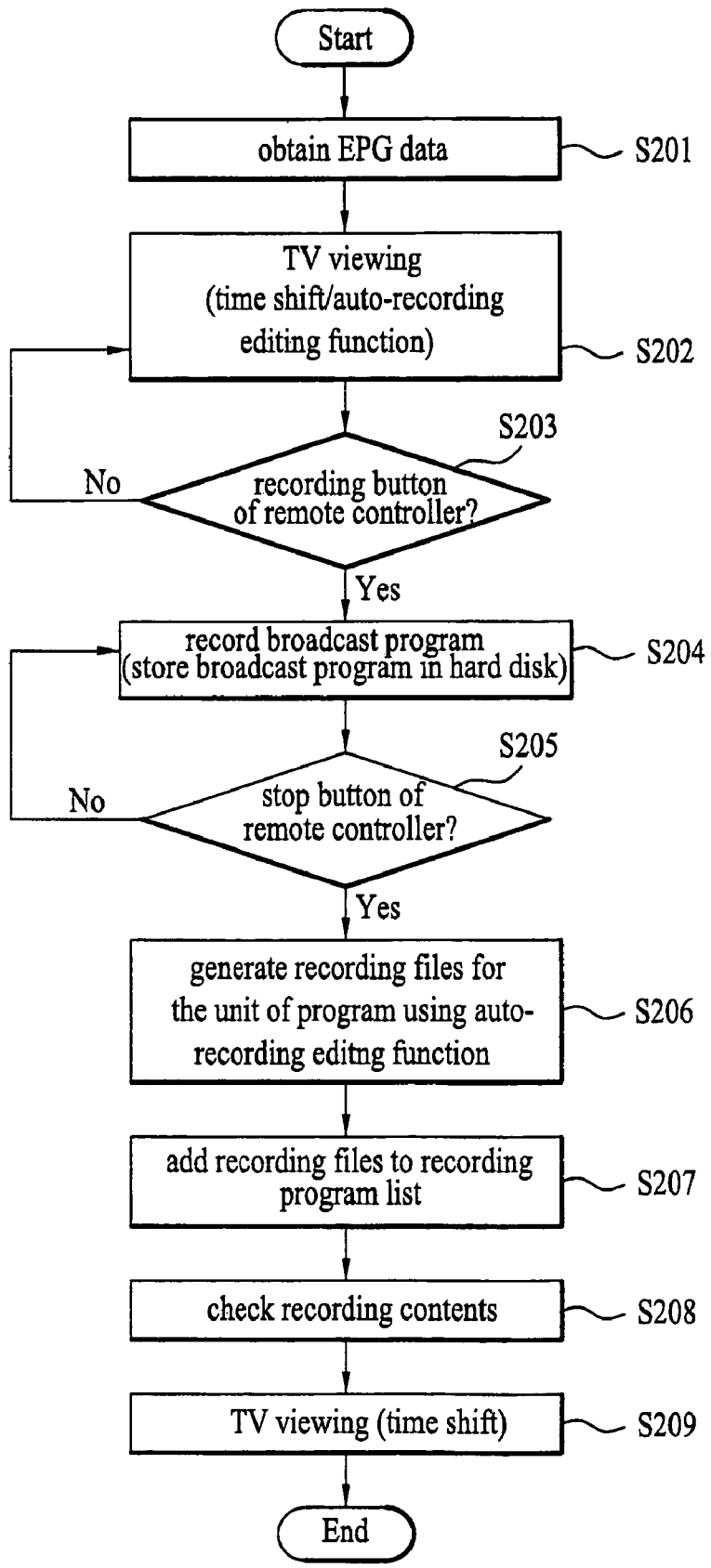
FIG. 2 is a flow chart illustrating a method for recording a broadcast program in a storage medium in a digital broadcast recorder according to the preferred embodiment of the present invention.

FIG. 2 is a flow chart illustrating a method for recording a broadcast program using a digital broadcast recorder having an auto-editing function in accordance with the preferred embodiment of the present invention. For reference, detailed description will be made with reference to the accompanying drawings if necessary.

As shown in FIG. 2, if video, audio and data streams are transmitted from a broadcasting station, EPG data included in the data streams among the received broadcast streams are stored in a memory (S201).

At this time, a user can search for a desired broadcast program using either an input unit such as a remote controller or the EPG data to view it.

If the user selects a time shift function while viewing the program, viewing contents for a certain time period are temporarily stored in an HDD (S202).

In this case, time shift recording continues to be carried out unless the user stops the time shift function. At this time, the digital broadcast recorder analyzes program start time, program end time, channel data, and title included in the EPG data to automatically edit the broadcast program stored in the HDD during time shift recording, for the unit of program.

The unit of program is also referred to as event, and the broadcast program is automatically edited for the unit of program if one unit program passes during time shift recording. For example, if two broadcast programs are recorded during time shift recording, two recording files are automatically generated. At this time, each name of the files may be displayed by any one of title, recording time data, and channel data. Alternatively, each name of the files may be displayed by combination of at least two or more data.

This will be described in more detail with reference to the accompanying drawings.

FIG. 3 is an exemplary view illustrating an EPG broadcast table in a PVR according to the preferred embodiment of the present invention.

First, the EPG data will be described. The EPG data are those transmitted through a program and system information protocol (PSIP), and mean application for transmitting programs broadcasted to the user through a TV screen and their related data. The user can view broadcast channel and program data for one day, one week, or one month through the EPG, and can select a current broadcast program to select a channel or carry out reserved recording. Also, the user can view summary or detailed description of each program.

Among the EPG data, data such as start time, broadcast time, and title of each program are transmitted through an event information table (EIT) while additional information of the program is transmitted through an extended text table (ETT).

Accordingly, as shown in FIG. 3, the EPG data include program start time, program end time, channel number, and program title. For this reason, the user can edit the broadcast program for the unit of program during time shift recording by analyzing the EPG data.

For example, supposing that the current time indicates 2004-10-11 06:00 and the user continues to carry out time shift recording for sixty minutes in a channel number 7-1, two recording files are added to the recording program list. In other words, one recording file titled "KBS news forum" from 06:00 to 06:45 and the other recording file titled "morning episode" from 06:45 to 07:00 are respectively stored in the HDD.

At this time, the auto-editing time period is determined as at least one of the time period whenever the program is changed during time shift recording, the time period when time shift recording is ended, and the time period when instant recording is selected.

Accordingly, the user can identify the automatically edited recording program from the recording program list.

Meanwhile, if the user selects instant recording by pushing a recording button of the remote controller or a main body while general viewing or time shift recording (S203), the broadcast program being currently displayed in the screen starts to be recorded in the HDD (S204). At this time, if time shift recording is being carried out, time shift recording is ended and instant recording starts.

Afterwards, if the user inputs a recording stop button (S205), the digital broadcast recorder automatically edits total recording contents for a recording time period for the unit of program and stores the edited recording contents in the HDD (S206).

In other words, if instant recording is being carried out and/or instant recording is ended, the digital broadcast recorder analyzes referring to the EPG data whether several programs are included in the current recording time period during instant recording. If at least a plurality of programs are included in the current recording time period, the digital broadcast recorder divides and edits recording contents for the unit of program.

At this time, the digital broadcast recorder searches for data such as title and summary of a corresponding program from the EPG data for the unit of the divided program and stores the searched data in the HDD.

In other words, recording is carried out once but recording contents are stored in the HDD by the auto-editing function for the unit of program to facilitate search. That is to say, recording is carried out once but recording files are generated for the unit of program.

The recording files generated for the unit of program are added to the recording program list (S207), and the user can identify the recording result from the recording program list (S208). If the user selects one of the recording files included in the recording program list and commands replay, the program managed by the selected recording file is read out from the HDD and then replayed (S209). At this time, if the replay program is one recorded by time shift recording, it is deleted from the HDD simultaneously with replay. If the replay program is one recorded by instant recording, it remains in the HDD even after replay.

Figure 4:
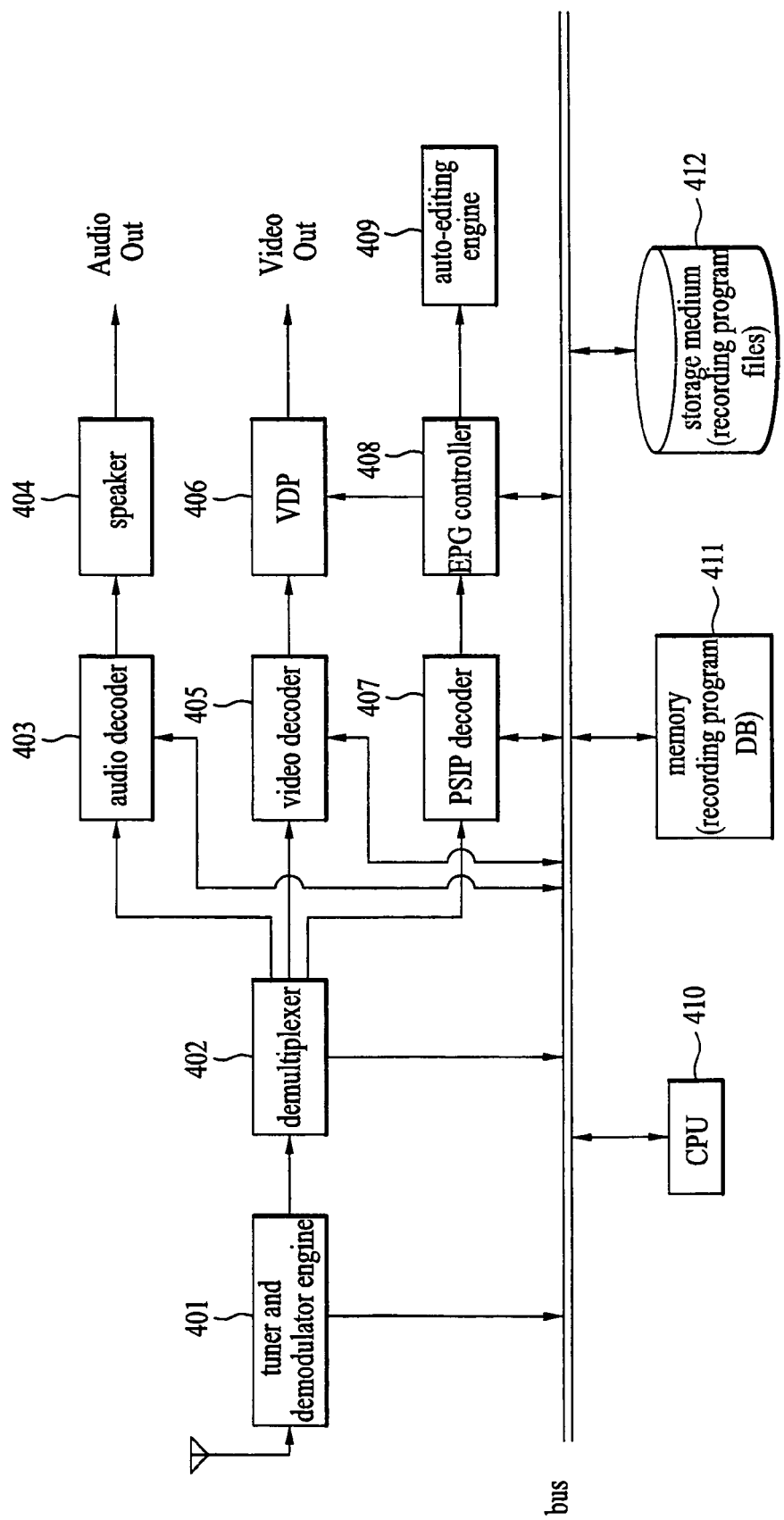
FIG. 4 is a block diagram illustrating inner configuration of a digital broadcast recorder according to the preferred embodiment of the present invention.

FIG. 4 is a block diagram illustrating one example of the digital broadcast recorder according to the preferred embodiment of the present invention.

The digital broadcast recorder according to the preferred embodiment of the present invention includes a tuner and demodulator module 401, a demultiplexer 402, an audio decoder 403, a speaker 404, a video decoder 405, a video display processor (VDP) 406, a PSIP decoder 407, an EPG controller 408, an auto-editing engine 409, a CPU 400, a memory 410, and a storage medium (HDD) 420.

The tuner and demodulator module 401 receives a broadcast signal of a specific channel and demodulates the received broadcast signal. The demodulated broadcast signal is a transport stream type signal and includes video data, audio data, and PSIP data.

The demodulated broadcast signal is divided into the video data, the audio data, and the PSIP data through the demultiplexer 402 and then output.

The audio data are audio-decoded by the audio decoder 403 and then output through the speaker 404. The video data are video-decoded by the video decoder 405 and then output to the screen through the VDP 406.

The PSIP data are decoded by the PSIP decoder 407, and the EPG data included in the PSIP data are synthesized with a main screen through the EPG controller 408 in accordance with the user's selection and then output through the VDP 406.

Meanwhile, the EPG controller 408 outputs the EPG data to the auto-editing engine 409 during time shift recording or instant recording. The auto-editing engine 409 analyzes the input EPG data to determine whether several programs are included in the current recording time period during time shift recording or instant recording. Recording contents included for the recording time period are stored and managed in the storage medium 420 such as HDD for the unit of program in accordance with the determined result. Each name of the recording files generated for the unit of program are automatically generated inside the system and then displayed. Alternatively, each name of the recording files may be displayed along with some or total of any one of title, recording time data, and channel data or combination of at least two or more data.

Furthermore, data such as title and summary of a corresponding program are searched from the EPG data for the unit of the divided program and then stored in the storage medium 420 along with the corresponding program. In this way, recording for the unit of program is completed. In other words, the completed recording contents are stored in the storage medium 420 as the recording files.

The recording program data and the EPG data are stored in the memory 410, and the CPU 400 serves to control each element blocks to carry out the aforementioned functions.

Meanwhile, it is apparent that although time shift recording and instant recording have been described in the present invention, specific recording such as reserved recording may be applied to the present invention in view of technical ideas of the present invention.

Furthermore, it is apparent that Meta data type program data as well as the EPG data type program data may be applied to the present invention.

As described above, the digital broadcast recorder and the recording method thereof have the following advantages.

First, since the digital broadcast recorder automatically edits and stores the broadcast program using the EPG data for the unit of program during recording of the broadcast program, it is possible to enhance the user's convenience.

Second, since the broadcast program is recorded and managed for the unit of program, it is possible to more effectively enhance the user's convenience during search and replay of the recorded program.

Finally, it is possible to obtain additional functions for the user's convenience, such as preference for the automatically edited recording program and auto-registration of favorite programs, using the EPG data such as viewing time, program title, and channel data.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording method of a digital broadcast recorder having a storage medium, the recording method comprising:
    a) analyzing transmitted channel data and program data; and
    b) editing a broadcast program for the unit of program referring to the analyzed channel data and program data during recording of the broadcast program to store and manage the edited broadcast program in the storage medium.

2. The method as claimed in claim 1, wherein the channel data and the program data include at least one of program start time, program end time, channel number, and title.

3. The method as claimed in claim 1, wherein the channel data and program data are transmitted in an EPG data type or Meta data type.

4. The method as claimed in claim 1, wherein the recording of the broadcasting program is at least one of time shift recording, instant recording, and reserved recording.

5. The method as claimed in claim 1, wherein the step b) includes managing recording contents edited for the unit of program using files, each name of the files being determined to include at least one of title, time data and channel data of a corresponding program.

6. The method as claimed in claim 5, wherein the recording contents managed using the files include a corresponding broadcast program and channel and program data related to the corresponding broadcast program.

7. The method as claimed in claim 5, wherein the step b) further includes adding the files generated for the unit of the edited program to a recording program list.

8. A digital broadcast recorder comprising:
a storage medium;
a data processor receiving channel data and program data and storing the received channel data and program data therein; and
an auto-editing engine analyzing the stored channel data and program data during recording of a broadcast program, and editing the broadcast program for the unit of program referring to the analyzed channel data and program data during recording of the broadcast program to store and manage the edited broadcast program in the storage medium.

9. The digital broadcast recorder as claimed in claim 8, wherein the channel data and program data include at least one of program start time, program end time, channel number, and title.

10. The digital broadcast recorder as claimed in claim 8, wherein the data processor receives and stores the channel data and program data transmitted in an EPG data type or Meta data type.

11. The digital broadcast recorder as claimed in claim 8, wherein the recording of the broadcasting program is at least one of time shift recording, instant recording, and reserved recording.

12. The digital broadcast recorder as claimed in claim 8, wherein the auto-editing engine manages recording contents edited for the unit of program using files.

13. The digital broadcast recorder as claimed in claim 12, wherein the recording contents managed using the files include a corresponding broadcast program and channel and program data related to the corresponding broadcast program.

14. The digital broadcast recorder as claimed in claim 12, wherein the auto-editing engine includes each name of the files generated for the unit of program, each name being determined to include at least one of title, time data and channel data of a corresponding program.

15. The digital broadcast recorder as claimed in claim 12, wherein the auto-editing engine adds the files generated for the unit of program to a recording program list if recording is ended.

16. The digital broadcast recorder as claimed in claim 8, wherein the storage medium is a hard disk drive (HDD).

* * * * *